Dec. 6, 1960 G. M. SLOCOMB 2,963,698

DIGITAL-TO-ANALOG CONVERTER

Filed June 25, 1956

INVENTOR.
GEORGE M. SLOCOMB

BY

Christie, Parker & Hale
ATTORNEYS

United States Patent Office 2,963,698
Patented Dec. 6, 1960

2,963,698

DIGITAL-TO-ANALOG CONVERTER

George M. Slocomb, Altadena, Calif., assignor, by mesne assignments, to Consolidated Electrodynamics Corporation, Pasadena, Calif., a corporation of California Filed June 25, 1956, Ser. No. 593,528

6 Claims. (Cl. 340—347)

This invention relates to digital-to-analog converters, and more particularly, is concerned with a transistorized circuit for providing very high speed conversion of digital information to analog form.

One well known method of converting digital type data to analog form involves a plurality of relays which connect weighted resistors to one or the other of two potentials in response to received digital information. The output voltage may be made directly proportional to the binary number input which sets up a particular pattern on the relays. However, this method depends upon the fact that the resistance, as seen from the output terminals through any one of the weighted resistors and the associated relay switch, be constant. This requires that the potential source have a zero impedance and have a voltage which is regulated within the limits of accuracy of the system regardless of the current demand put on the potential source by switching in and out of various combinations of the weighted resistors.

The present invention provides a converter utilizing the general principal of operation of the above-described type of converter with improved speed, reliability, and accuracy. Yet, the converter of the present invention avoids the severe limitations placed on the power supply of the prior art converters.

In addition, the present invention provides a converter which is more compact and more efficient in operation.

These advantages of the present invention are achieved by a converter comprising a plurality of series circuits, each series circuit including a resistor and a zener reference diode connected in series across a potential source. Weighted resistors connect each of the series junction points between the resistors and zener reference diodes to a common output terminal. Switching is provided by a plurality of transistors having their emitter electrodes connected to the respective series junction points of the series circuits, and their collector electrodes connected to a common return with the input and output to the converter circuit. The base electrodes of each of the transistors comprising the switching circuits are coupled to input means, such as a flip-flop forming part of a counter circuit or a shifting or storage register for changing the base current abruptly to one of two alternative levels in response to binary digit information stored in the flip-flop.

For a better understanding of the invention reference should be had to the accompanying drawing, wherein.

Figure 1:
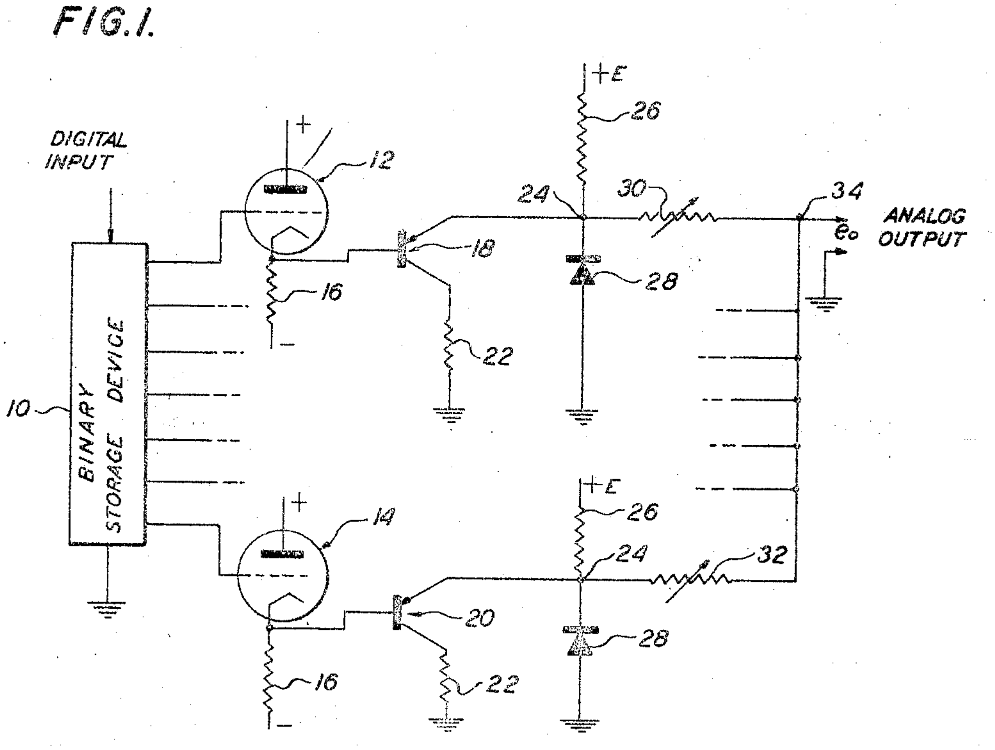
Fig. 1 is a schematic circuit diagram of the converter circuit.

In Fig. 1, the numeral 10 indicates generally a binary storage device which, for example, may be a counter, a storage or shifting register, or other such device, including a plurality of flip-flop circuits or similar bistable means, on which a particular binary word pattern can be estabilshed. Each of the flip-flops is connected to the grid of a cathode follower tube, only two of which are indicated at 12 and 14 for the sake of clarity. Each of the cathode followers includes a cathode resistor 16 connected to a negative potential source (not shown), the plate of each of the cathode followers being connected to a positive potential source.

The cathode of each of the cathode followers is connected to the base electrode of a transistor, such as indicated at 18 and 20. The transistors are preferably of a fused junction type and are shown as PNP transistors in the embodiment described. However, the circuit may be modified to use NPN type transistors. The collector electrode of each transistor is connected to ground through an associated compensating resistor 22, the function of which will hereinafter be described. The emitter electrode of each of the transistors is connected to the series junction point 24 between a resistor 26 and a zener reference type diode 28, the series circuit formed by the resistor 26 and diode 28 being connected across a potential source (not shown). The respective series junction points 24 are connected through summing resistors, such as indicated at 30 and 32, to a common output terminal 34.

The function of each transistor is to act as a switch in shunt across the corresponding zener reference diode. Operation of a transistor as a switch has been previously described in an article entitled "Small Signal Analysis of Floating-Junction Transistor Switch Circuits" by N. W. Bell, I.R.E. Transaction of Group on Electronic Devices, October 1955. By varying the base current, the effective emitter to collector impedance can be varied considerably. In the closed condition, for example, the switch presents a low resistance of the order of 10 ohms in series with a small voltage of the order of 2.5 millivolts. In the open condition, the switch presents a high resistance of the order of 50,000 ohms.

When the transistor switch is closed, current flows from the source +E through the emitter to the base of the transistor. As a result, a potential drop exists between the emitter and collector electrodes, with the emitter being positive. The purpose of the compensating resistor 22 in the collector circuit of each of the transistors is to compensate for this potential drop. The value of the resistor 22 can be selected to produce a compensating drop due to the flow of collector current which is equal to the voltage existing between the emitter and collector electrodes, so that the net voltage at the junction 24 may be reduced substantially to zero with respect to ground.

It is a characteristic of a crystal diode that when a certain voltage is exceeded in the inverse direction, the diode breaks down and the current abruptly increases. This break-down point is called the "zener point." The zener reference diode is a diode specifically designed for operation at the zener point. It is characterized by the sharpness and stability of the zener point, so that it may be used to give voltage regulation. Since the impedance is quite small at the zener point, relatively large changes in current do not materially affect the voltage drop across the diode.

It will be seen in operation, that when the transistor switch is in its open condition, providing a substantially high impedance in shunt with the zener diode, the potential at the series junction point 24 will be set by the zener break-down voltage of the diode 28. The potential at the series junction point 24 will be unaffected by small changes in the potential across the series circuit comprising the resistor 26 and diode 28 because of the voltage regulating properties of the diode 28.

However, when the transistor switch is in its closed condition, the series junction point 24 will be substantially at ground potential. Accordingly, the series junction point 24 varies between the two fixed potential levels as the transistor switch is opened and closed in response to the associated flip-flop in the binary storage device 10. By appropriately adjusting the summing resistors 30, 32, the output voltage $e_0$ may be set to any predetermined level in steps from zero to a maximum according to the pattern of open and closed transistor switches as set by the binary storage device 10.

It should be noted that the summing resistors 30, 32 are made adjustable rather than fixed, because the zener point of each of the diodes 28 may vary slightly within design limits.

By way of example, a practical converter circuit of the present invention may have the following values:

| | |
|---|---|
| Transistor type | General Electric 2N43 |
| Zener diode | National Semi-Conductor 1N429 |
| Resistor 22 ________ohms__ | 6 |
| Resistor 26 ________do____ | 10,000 |
| Voltage E ________volts__ | 55 |

Figure 2:
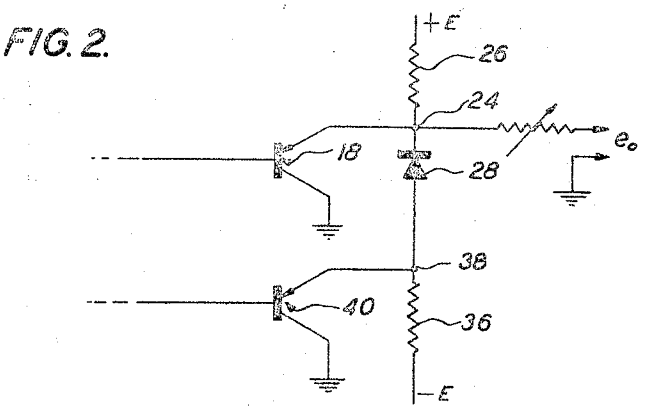
Fig. 2 is a schematic diagram of a modification of the circuit of Fig. 1.

In the circuit of Fig. 1, the zener diode current changes from zero to rated value as the switch changes from closed to open. In some applications this may cause an undesirable transient drift of output voltage due to temperature changes resulting from variation in heating due to current flow. While zener diodes are available which are extremely stable with changes in temperature, their cost is quite high. The variable heating of the zener diode may be avoided, however, by providing a switching circuit in which a constant zener diode current is maintained. This circuit is shown in the modification of Fig. 2.

In this circuit, a second resistor 36 in series with the zener diode 28 connects the zener diode to a negative potential source, (not shown). The series junction point, indicated at 38, between the zener diode 28 and the second series resistor 36, is connected to the emitter electrode of a second transistor, indicated generally at 40. The collector of the first transistor 18 and the second transistor 40 are both connected directly to ground. The base electrode of the transistor 40 is connected through a suitable cathode follower (not shown) to the opposite side of the flip-flop in the binary storage device 10. Thus when the current level in the base electrode of the first transistor 18 is raised to a high level, the current in the base electrode of the second transistor 40 is set at a low level. Accordingly, the switch circuit provided by the transistor 18 is closed when the switching circuit provided by the transistor 40 is open, and vice versa, depending upon which of two stable states the associated flip-flop in the binary storage device is in.

With this circuit it will be seen that the zener diode 28 will always be operated at its zener voltage point and the current through the diode will remain essentially constant. Nevertheless the series junction point 24 will jump in potential by operation of the switching circuits formed by the transistors 18 and 40. This circuit has the additional advantage that smaller currents pass through the transistor switches so that the switch driving currents can therefore be much smaller than for a single switch unit. The smaller currents also avoid the necessity for the compensating resistors 22 provided in the circuit of Fig. 1.

From the above description it will be seen that a converter circuit is provided by the present invention which has a high degree of stability without the need for a closely regulated and highly stable power supply. The adjustable summing resistors can be adjusted to give any desired potential within the limits imposed by the circuitry for a given digital pattern in the storage device 10. By virtue of the zener reference diodes, the impedance at the output terminal remains constant regardless of the switching pattern on the transistor switching circuits. The transistors provide extremely fast switching time, of the order of one microsecond, and therefore are preferred over the usual relay switch.

What is claimed is:

1. A digital-to-analog converter comprising a plurality of series circuits, each circuit including a resistor and a zener reference diode connected in series across a voltage source, a plurality of resistors connecting the series junction between the diode and resistor of each of the series circuits to a common output terminal, and a plurality of transistors, each including a base electrode, an emitter electrode, and a collector electrode, the emitter electrode of each transistor being connected to a respective one of said series junctions of the series circuits, a compensating resistor connected to the collector electrode of each transistor, the compensating resistors being connected to a common return for the input and for the output, and means coupled to the base electrodes of the respective transistors for changing the base current abruptly to one of two alternative levels in response to received binary digit pulse information.

2. A digital-to-analog converter comprising a plurality of series circuits, each circuit including a resistor and a zener reference diode connected in series across a voltage source, a plurality of resistors connecting the series junction between the diode and resistor of each of the series circuits to a common output terminal, and a plurality of transistors, each including a base electrode, an emitter electrode, and a collector electrode, the emitter electrode of each transistor being connected to a respective one of said series junctions of the series circuits, means for connecting the collector electrode to a common return with the input and output of the converter, and means coupled to the base electrodes of the respective transistors for changing the base current abruptly to one of two alternative levels in response to received binary digit pulse information.

3. Apparatus as defined in claim 2 wherein each of said series circuits further includes a second resistor connected to a negative potential source, the zener diode being connected between the two resistors, a plurality of transistors having their respective emitter electrodes connected to the series junction point between the second resistor and the zener diodes, and means coupled to the base electrodes of said last-named transistors for changing the base current abruptly to one of two alternative levels in response to received binary digit pulse information, the base electrodes of the last-named transistors being changed to the opposite current level from the base electrodes of said first-named transistors.

4. A digital-to-analog converter comprising a plurality of series circuits, each circuit including a resistor and a zener reference diode connected in series across a voltage source, a plurality of resistors connecting the series junction between the resistor and diode of each of the series circuits to a common output terminal, and a plurality of transistor switching circuits, each including a transistor having two of the electrodes thereof connected respectively to opposite ends of the zener diode, and input means responsive to received binary digit information for selectively setting the current level in the remaining electrode of each of the transistors to one of two conditions depending on the binary digits received, whereby the respective transistors provide a high or low shunting impendance across the respective zener diodes.

5. A digital-to-analog converter comprising a plurality of series circuits, each circuit including a resistor and a zener reference diode connected in series, means for applying a potential across the series circuits having a polarity to induce current flow in the back direction of the zener diode for producing breakdown of the diode at the zener point, whereby the zener diode provides a substantially constant voltage drop thereacross, a plurality of resistors respectively connecting the series junction between the resistor and diode of each of the series circuits to a common output terminal, and switching means for selectively connecting each of the series junction points between the resistor and zener diode of each series circuit through a low impedance current path to bypass current normally flowing in the back direction through the zener diode, whereby the potentials at the respective series junction points are selectively set at one of two levels by the switching means, and input means responsive to received binary digit information for selectively setting each of the switching means to one of two impedance conditions thereof, depending on the binary digits received.

6. Apparatus as defined in claim 5 further including a second resistor in each of the series circuits with the zener diode connected in series between the two resistors, and the switching means further including means to connect the series junction point of the zener diode and second resistor in each of the series circuits through said low impedance path, the switching means being arranged to connect only one of the two series junction points in each series circuit through the low impedance current path at a time.

References Cited in the file of this patent

UNITED STATES PATENTS

| | | |
|---|---|---|
| 2,505,029 | Carbrey | Apr. 25, 1950 |
| 2,538,615 | Carbrey | Jan. 16, 1951 |
| 2,693,572 | Chase | Nov. 2, 1954 |
| 2,736,889 | Kaiser | Feb. 28, 1956 |
| 2,751,549 | Chase | June 19, 1956 |
| 2,775,727 | Kernahan et al. | Dec. 25, 1956 |
| 2,803,815 | Wulfsberg | Aug. 20, 1957 |